(12) United States Patent
Saito et al.

(10) Patent No.: US 7,576,029 B2
(45) Date of Patent: Aug. 18, 2009

(54) CATALYST

(75) Inventors: Masayuki Saito, Hiratsuka (JP);
Takeyuki Sagae, Hiratsuka (JP)

(73) Assignee: Tanaka Kikinzoku Kogyo K.K., Tokyo (JP)

( * ) Notice: Subject to any disclaimer, the term of this patent is extended or adjusted under 35 U.S.C. 154(b) by 350 days.

(21) Appl. No.: 10/587,066

(22) PCT Filed: Mar. 18, 2005

(86) PCT No.: PCT/JP2005/004951

§ 371 (c)(1),
(2), (4) Date: Jul. 20, 2006

(87) PCT Pub. No.: WO2005/092494

PCT Pub. Date: Oct. 6, 2005

(65) Prior Publication Data

US 2007/0161506 A1    Jul. 12, 2007

(30) Foreign Application Priority Data

Mar. 25, 2004    (JP) .............................. 2004-090349

(51) Int. Cl.
*B01J 23/10* (2006.01)

(52) U.S. Cl. ..................................................... 502/302

(58) Field of Classification Search .................... None
See application file for complete search history.

(56) References Cited

U.S. PATENT DOCUMENTS

| | | | |
|---|---|---|---|
| 3,900,429 A * | 8/1975 | Komatsu et al. ............. | 502/303 |
| 4,537,873 A | 8/1985 | Kato et al. ................... | 502/242 |
| 4,554,291 A * | 11/1985 | Gupta et al. ................. | 518/700 |
| 5,418,204 A * | 5/1995 | Kolaczkowski et al. ..... | 502/439 |
| 5,480,854 A | 1/1996 | Rajaram et al. ............. | 502/304 |
| 5,849,658 A * | 12/1998 | Shibanuma et al. ......... | 502/228 |
| 6,692,712 B1 * | 2/2004 | Andersen .................. | 423/239.1 |
| 2003/0027874 A1 * | 2/2003 | Herron et al. ............... | 518/713 |

(Continued)

FOREIGN PATENT DOCUMENTS

JP    59-160536    9/1984

(Continued)

OTHER PUBLICATIONS

Hori et al, the effects of aging temperature and aging time on the oxygen sotrage capacity of Pt-Rh/CeZrO2 catalysts, 2001, brazilian journal of chemical engineering, vol. 18 No. 1.*

(Continued)

*Primary Examiner*—Melvin C Mayes
*Assistant Examiner*—Stefanie Cohen
(74) *Attorney, Agent, or Firm*—Roberts & Roberts, LLP

(57) ABSTRACT

The present invention provides a catalyst comprising particles of one or more catalytic metals supported on a porous carrier made of one or more metal oxides, wherein the porous carrier is made of an oxide containing a rare earth oxide, and that the catalytic metal particles are made of one or more transition metals or transition metal oxides having 10 to 50000 atoms. In the present invention, cluster-like catalyst particles are supported on a specific carrier. The catalyst of the present invention maintains desirable activity while changing the morphology of catalyst particles by the atmosphere of the catalyst.

5 Claims, 4 Drawing Sheets

U.S. PATENT DOCUMENTS

2003/0170160 A1 * 9/2003 Morita et al. ............... 423/247

FOREIGN PATENT DOCUMENTS

| | | |
|---|---|---|
| JP | 60-50491 | 3/1985 |
| JP | 63-116741 | 5/1988 |
| JP | 06-219721 | 8/1994 |
| JP | 2000-051705 | 2/2000 |
| JP | 2000-140644 | 5/2000 |
| JP | 2002-102701 | 4/2002 |
| JP | 2004-057949 | 2/2004 |

OTHER PUBLICATIONS

Sugimoto, Monodispersed particles, elsevier, 2001, p. 630.*

* cited by examiner

Fig. 2
(a)
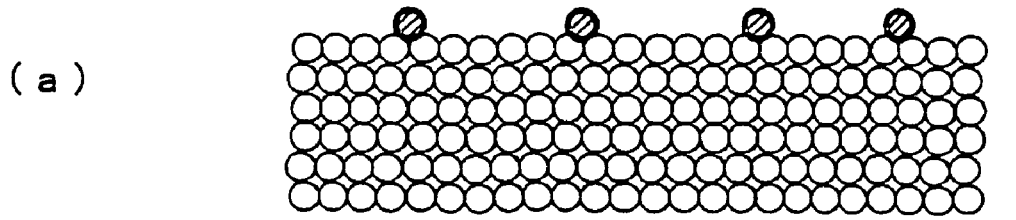
(b)
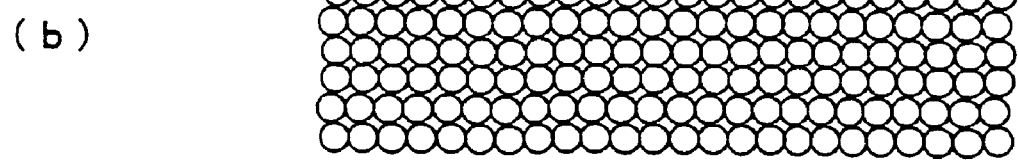
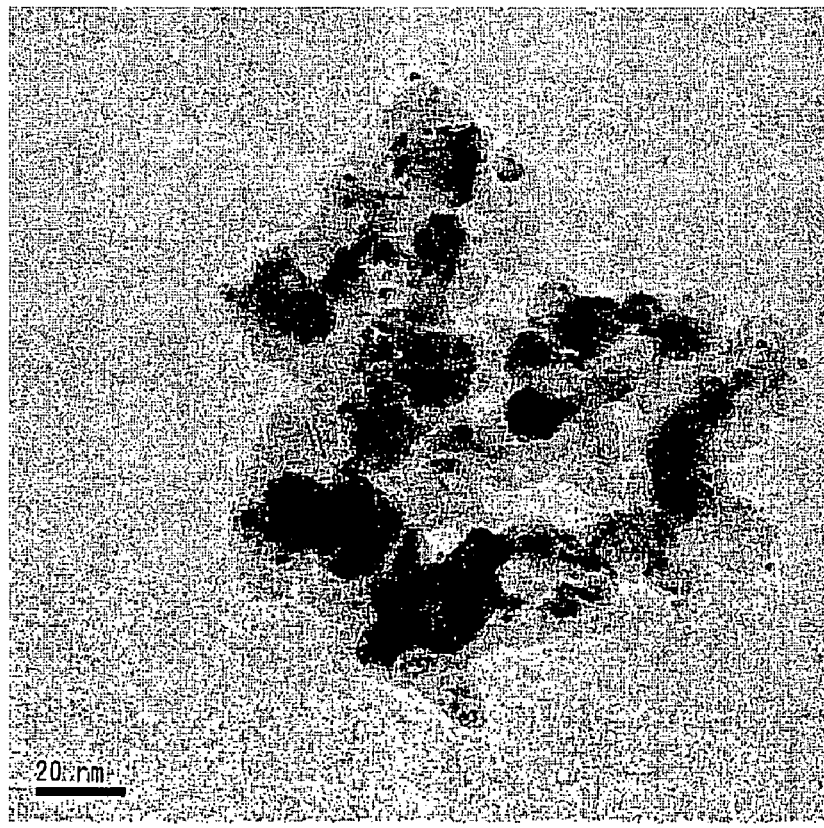
Fig. 3

CATALYST

TECHNICAL FIELD

The present invention relates to a catalyst. More particularly, the present invention relates to a catalyst comprising a transition metal carried as catalyst particles.

BACKGROUND ART

Catalysts are used in various fields, in promoting reactions, such as reactions for the synthesis of compounds and reactions of fuel cells, and also in cleaning automobile emissions. In many catalysts which have hitherto been used, porous materials, such as oxides of alumina, silica and the like and carbon, are used as a carrier, and precious metals, such as platinum, palladium and rhodium, are supported by the carrier. In recent years, multicomponent catalysts in which multiple precious metals are supported to improve activity have been growing popular. Also with respect to carriers, in catalysts for treating automobile emissions, recent years have seen the use of carriers to which there are added ceria having oxygen adsorbing and releasing abilities and a ceria-zirconia solid solution in which the oxygen absorbing and releasing abilities and heat resistance of ceria are improved in order to mitigate atmospheric variations of emissions.

These catalysts are usually manufactured by impregnating a porous oxide carrier with a metal salt solution, such as dinitrodiamine platinum, platinum chloride acid and rhodium nitrate, and performing calcination in a reducing atmosphere. Also, multicomponent catalysts are manufactured by preparing multiple metal salt solutions to be supported, mixing a carrier with the multiple metal salt solutions and causing multiple kinds of metal ions to be adsorbed on the carrier, and performing drying and calcination thereafter. In catalysts manufactured by these methods, during the impregnation with a metal salt solution, metal single particles in an atomic state are adsorbed on the carrier, and the single particles in an atomic state migrate and aggregate into catalyst particles due to heat treatment which is performed after that.

Patent Document 1: Japanese Patent Application Laid-Open No. 60-50491

Patent Document 2: Japanese Patent Application Laid-Open No. 63-116741

In recent years, the environment in which catalysts are used have been increasingly severe. For example, in catalysts for cleaning emissions, owing to the enhancement of emission control against the background of the global environment protection, examinations are being made as to installing a catalyst immediately under a manifold closer to an engine than before. In this case, the emission temperature becomes as high as not lower than 800° C. during high-speed travels of vehicles.

Therefore, although a catalyst capable of maintaining high activity for a long period even in a high-temperature atmosphere is sought after, there have hitherto been no catalysts that sufficiently meet this requirement. That is, in conventional catalysts, catalyst particles are released from the constraint done by a carrier in a high-temperature atmosphere and can migrate, and the catalyst particles which have migrated come into contact with other catalyst particles and aggregate with them, and become coarsened, with the result that the activity of the whole catalyst decreases. In particular, alumina, silica and the like which have hitherto been used as porous carriers have a low constraining force working on catalytic metals, and tend to allow catalytic metals to migrate due to the heat during the use of a catalyst, with the result that it is difficult to maintain activity.

In the field of catalysts, an improvement of activity is constantly required. Although in this respect there are many conventional catalysts having high activity, requests for the development of catalysts of high activity which exceed the conventional catalysts are high.

The present invention has been made against the above-described background and has an object to provide a catalyst which has high activity and can maintain its activity for a long period even in a high-temperature environment.

DISCLOSURE OF THE INVENTION

In order to solve the above-described problem, the present inventors made investigations for the following two points.

The first means is an improvement of the supporting condition of catalyst particles. In the above-described conventional catalysts, a metal in an atomic state is used as a precursor of catalyst particles and the metal in an atomic state is heated on a carrier and caused to aggregate into catalyst particles. However, the present inventors thought that when catalytic metal particles are supported, it is preferable that cluster-like metal particles which gather in a desirable number of atoms be supported. This is because in conventional catalysts, even when catalyst particles are caused to aggregate by the heating after being supported, it is difficult to cause the catalyst particles to aggregate to a desirable number of atoms, and there is a limit to an improvement of activity.

The second means is the selection of a desirable carrier. Oxides such as alumina which are generally used in conventional catalysts have a weak interaction with transition metals which are used as catalytic metals, and tend to cause catalytic metals to migrate relatively easily also after they support the catalytic metals. Therefore, the present inventors have thought that by using a porous oxide which has a large constraining force working on transition metals, it is possible to suppress the migration of catalytic metals even at high temperatures and hence it is possible to suppress the coarsening of catalyst particles and the deactivation of catalysts.

The present inventors have made examinations for the above-described two points. And during the process of the examinations they found out that when a carrier containing a rare earth oxide is used and cluster-like catalytic metal particles are supported by the carrier, the condition of the catalyst particles shows a state different from that of catalyst particles of conventional catalysts and the catalyst particles exhibit very high activity, and they have reached the present invention.

The catalyst of the present invention is a catalyst comprising particles of one or more catalytic metals supported on a porous carrier made of one or more metal oxides, wherein the porous carrier is made of an oxide containing a rare earth oxide, and that the catalytic metal particles are made of one or more transition metals or transition metal oxides having 10 to 50000 atoms.

The features of the present invention reside in that cluster-like catalytic metal particles having 10 to 50000 atoms are supported, and that a porous carrier containing an oxide of a rare earth metal is applied. The catalyst of the present invention exhibits a peculiar behavior in each stage of a state which occurs immediately after cluster-like metal particles are supported, a stage in which heat treatment is performed thereafter, a stage in which the catalyst is used in a high-temperature environment, and a stage in which the catalyst is exposed to a reducing environment, and the catalyst exhibits desirable catalytic characteristics in each of these stages. The morphology of a catalyst of the present invention will be described in detail below.

FIGS. 1(a) to 1(d) are diagrams which show a change in the morphology of a catalyst of the present invention which occurs according to variations in the atmosphere immediately after cluster-like catalytic metal particles are supported. FIG. 1(a) is a diagram which shows the state which occurs immediately after cluster-like catalytic metal particles are supported on a porous carrier. In the catalyst in this state, the catalytic metal particles are present on the carrier as aggregated particles having a roughly spherical shape. This catalyst has high catalytic activity because catalyst particles are formed as cluster-like aggregated particles although the interaction between the catalyst particles and the carrier is not very strong. In this state, the catalyst particles are in three dimensions and can be recognized by observation means such as TEM.

When this catalyst is in an oxidizing atmosphere, it comes to a state as shown in FIG. 1(b). Examples of an environment in which the catalyst takes this morphology include a case where after catalyst particles are supported by a carrier, the catalyst is subjected to calcining treatment in the air at temperatures of 400 to 500° C. or so, a case where the catalyst is used at these temperatures, and a case where the catalyst is heated in a high-temperature environment at not lower than 800° C. for a short time. When the catalyst is in this state, the catalyst particles develop into planar aggregates. Although the catalyst particles form a single layer of multiple layers having 1 to 5 atoms or so, the catalyst has high catalytic activity because the catalyst particles are still in cluster shape. In a catalyst in which catalyst particles in this state are supported on a carrier, the catalyst particles are fixed by a strong interaction with the carrier. Therefore, the catalyst particles do not easily migrate and the catalyst has the best durability and can maintain its high activity. Furthermore, because the catalyst particles in this state are formed in an oxidizing atmosphere, a complex oxide of a rare earth element and a transition metal element may sometimes be formed.

When the catalyst in the state of FIG. 1(b) is heated at high temperatures for a long time, for example, in a case where the catalyst is heated at high temperatures of not lower than 800° C. for a long time, the ratio of complex oxides of a rare earth element and a transition metal element increases although the morphology of the catalyst particles does not change (FIG. 1(c)). In the catalyst of this state, the activity decreases a little with a change of the catalyst particles to a complex oxide. However, even when a decrease in activity is observed, the activity is still higher than that of conventional catalysts and owing to a strong interaction with the carrier, the state that the catalyst particles do not easily migrate is maintained, and the catalyst is excellent in maintaining activity and desirable as the functions of catalysts. The catalyst particles of a catalyst in the state of (b) and (c) above have a thickness of 1 to 5 atoms or so and, therefore, it is impossible to observe the catalyst particles even if a TEM of a high resolving power is used. However, it is possible to detect the presence of the catalyst particles by an element analysis (a qualitative analysis) of the catalyst surface.

And when the catalyst in the state of (b) or (c) above is exposed to a reducing atmosphere, the catalyst particles on the carrier change their morphology and change into a roughly spherical shape having a diameter of 1 to 10 nm (FIG. 1(d)). Although the reason why catalyst particles which once became planar change their morphology like this in a reducing atmosphere is unknown, it is thought that this is because both the carrier and the precious metal are reduced, with the result that the affinity between the two weakens. The catalyst in this state has a morphology similar to that of the state of FIG. 1(a), but the interaction between the catalyst particles and the carrier is strong and the catalytic activity is kept in a high condition. Thus the catalyst in this state differs in characteristics.

A change in the morphology of catalyst particles observed in the catalyst of the present invention has been described above. This change is a phenomenon which is observed only in a case where a porous oxide containing a rare earth oxide is used as the carrier and a cluster-like transition metal is directly supported. In this respect, because in a conventional catalyst in which an atomic metal is supported, catalytic metal particles are supported in an isolated manner (FIG. 2(a)), the catalytic metal particles do not develop in a planer manner as in FIG. 1(a), nor in a cluster shape, although in an oxidizing atmosphere the oxidized condition of the catalytic metal particles is similar to that of the present invention. Therefore, the activity of the catalyst decreases.

The transition metals which compose catalyst particles function as the catalyst particles, and desirable transition metals are platinum, palladium, rhodium, iridium, gold, silver, ruthenium and osmium. Although only one kind of these transition metals may be contained in catalyst particles, two or more metals may be contained.

Although a carrier used in the present invention is made of a porous metal oxide containing ceria and may be formed only from ceria alone, it may be in a condition mixed with other metal oxides such as alumina and silica. Particularly, mixtures of rare earth metal oxides, such as a ceria-zirconia mixture oxide, in which zirconia is mixed with ceria, and a ceria-zirconia-yttria mixture oxide, in which zirconia and yttria are mixed with ceria, are desirable carriers from the standpoint of an improvement of the heat resistance of the carrier. It is desirable that the rare earth oxide content of this porous carrier be 15 to 100 wt %.

According to the present inventors, the characteristics of a catalyst of the present invention depend greatly on the specific surface area of an oxide which becomes the carrier. In the present invention, it is preferred that the oxide carrier have a specific surface area of 10 to 250 $m^2/g$ for 1 wt % of an amount of a catalytic metal supported relative to the whole catalyst. The reason why catalyst particles on the carrier takes a peculiar morphology as described above is that an interaction works between a rare earth metal present on the carrier surface and a precious metal supported on the carrier surface. Therefore, when the surface area of the carrier is small, it is impossible to exert the interaction on all catalytic metal particles. For example, when 1 wt % of platinum is supported on a carrier having a surface area of 5 $m^2/g$, a portion of platinum corresponding to 0.5 wt % forms catalyst particles of the construction shown in FIG. 1(b) and of the construction shown in FIG. 1(c), but an interaction with cerium does not occur for the rest of the platinum, with the result that during the use of the catalyst, the catalyst particles become aggregates without going through the construction of FIG. 1(b) and the construction of FIG. 1(c). This is the reason why the lower limit is set for the specific surface area. For the upper limit, that the preparation of a carrier having such a large surface area is difficult is the reason for setting. It is preferred that the amount of a catalytic metal supported is 0.5 to 5 wt % relative to the whole catalyst.

Next, a method of manufacturing a catalyst of the present invention will be described. In the present invention, it is necessary that at the stage when catalyst particles are supported on a carrier, the catalyst particles form cluster-like aggregates having 10 to 50000 atoms. In handling such cluster-like metal particles, conventionally the use of a metal colloid is conceivable. Also a catalyst of the present invention can be manufactured by using this metal colloid. As a method of causing cluster-like metal particles to be supported on a carrier in a simplified manner, it is also desirable to adopt a method which involves dispersing a metal salt of a transition metal to be supported, an organic substance, and a porous carrier in a solvent such as water, causing a hybrid complex consisting of transition metal ions and an organic substance on the carrier, and subjecting the porous carrier to reducing treatment.

In this method, the organic substance for constituting a hybrid complex is an organic compound capable of physical adsorption or chemical bonding with respect to transition metal ions, and it is possible to use polyacrylic acid, polymethacrylic acid, polyethylene imine, polyallylamine, polyvinyl pyrrolidone, polyvinyl alcohol, poly(N-carboxymethyl)ethylene imine, and poly(N,N-dicarboxymethyl) allylamine or copolymers containing at least one of them, polyamino acids and polysaccharides.

As the metal salt of a transition metal, it is possible to use salts of hexachloro acid, dinitrodiamine salts, dinitrodiamine nitrates, chlorides, nitrates, acetates, and lactates. In causing catalyst particles composed of two kinds or more of transition metals to be supported, this is made possible by dispersing targeted multiple kinds of metal salts in a solvent.

In the reducing treatment after the adsorption of a hybrid complex, it is preferred that a reducing agent be added to a solution in which the carrier has been mixed. As the reducing agent, it is possible to use hydrogen, formic acid, ethanol, methanol, propanol, butanol, formaldehyde, sodium borohydride, hydrazine, dimethylamine borane, and trimethylamine borane.

As described above, the catalyst of the present invention is a catalyst in which a porous carrier made of a ceria-containing organic oxide is used and the particle size (number of atoms) of catalyst particles is adjusted during the formation of the porous carrier. The catalyst of the present invention exhibits high reaction activity and has high durability because the coarsening of catalyst particles caused by use for a long time is suppressed.

The catalyst of the present invention changes its morphology by being subjected to a reducing atmosphere after its use (in an oxidizing atmosphere) and at the same time, the catalytic function is reproduced. Therefore, as a method of using the catalyst of the present invention, it is possible to reproduce the catalytic function by performing reducing treatment, which involves heat treating a catalyst after use in a reducing atmosphere, and to reuse the catalyst.

The catalyst of the present invention is useful as a catalyst for general gasoline engine and besides as a catalyst for diesel engine and a catalyst for lean burn engine. Particularly in the case of a gasoline engine, because a rich atmosphere and a lean atmosphere repeat periodically in a very short time, the catalyst can exhibit catalytic activity which is almost the same as immediately after its manufacture for a long time while repeating consumption and regeneration. Also in the case of a lean burn engine, because rich gas is periodically fed as a spike to the catalyst, the regeneration effect by reduction is expected during the operation of the engine and the catalyst can be used for a long period while repeating consumption and regeneration.

BRIEF DESCRIPTION OF THE DRAWINGS

FIGS. 2(a) and 2(b) are diagrams to explain a morphological change in a conventional catalyst by an atmosphere;

FIG. 3 is a TEM image obtained by an observation of the surface condition of a catalyst of an example after drying;

BEST MODE FOR CARRYING OUT THE INVENTION

Figure 1:
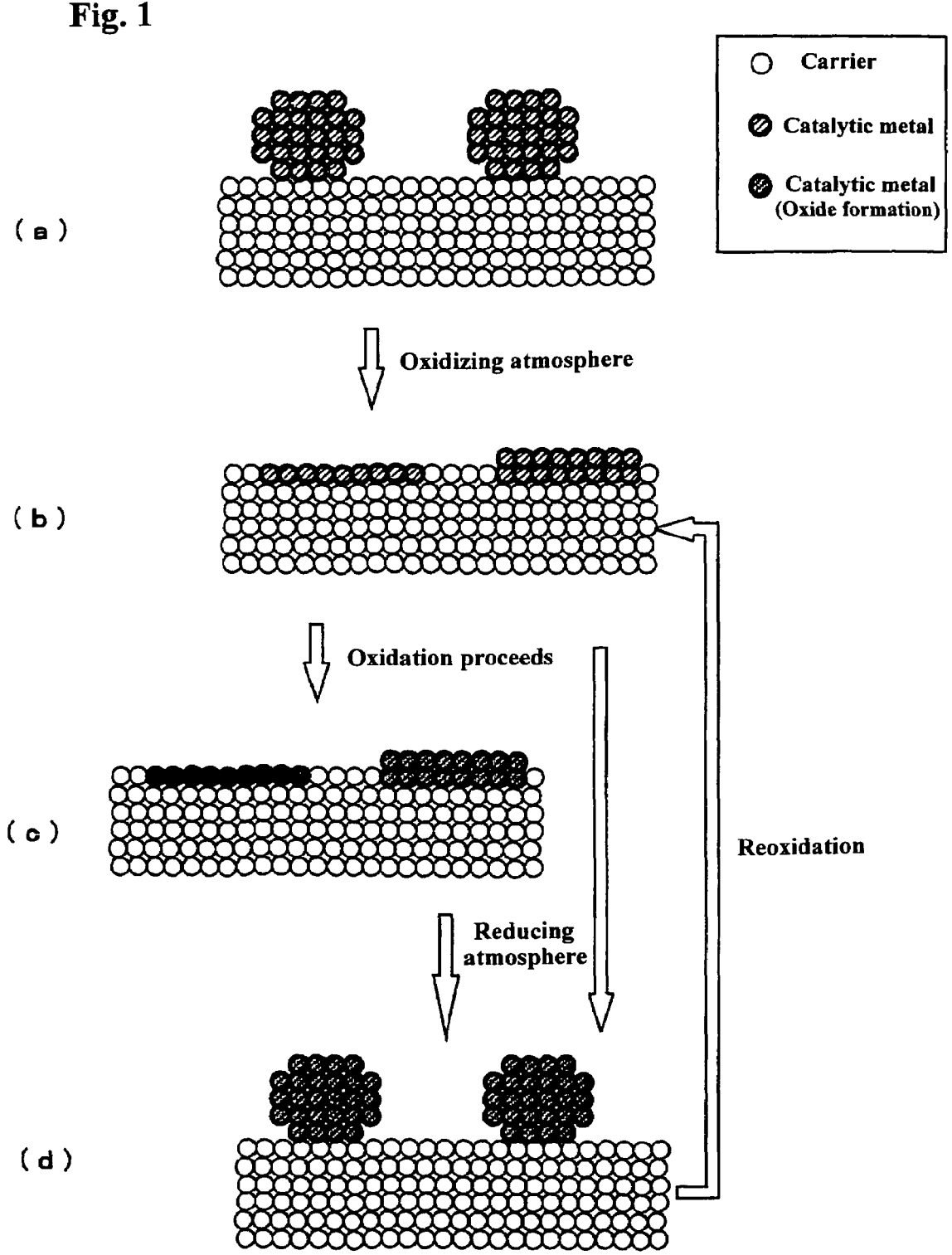
FIGS. 1(a) to 1(d) are diagrams to explain a morphological change in a catalyst of the present invention by an atmosphere.

Preferred examples of the present invention will be described below along with comparative examples.

Example 1

Pt/CZO Catalyst

A metal salt solution was prepared by diluting 22.01 g of a nitric acid solution of dinitrodiamine platinum (Pt Concentration: 4.54 wt %) with distilled water to 100 mL in a measuring flask. Gate other hand, 2.21 g of polyethylene imine (PET) having an average molecular weight of 50000 were diluted with distilled water to 100 mL in a measuring flask. And 10 mL of the metal salt solution and 4 mL of the PEI solution were mixed and stirred, the mixed solution was then added dropwise to a solution in which 10 g of CZO were dispersed, ammonia was added dropwise until pH 10 was obtained, and a hybrid complex was caused to be adsorbed on a CZO carrier. The surface area of this CZO catalyst is 67 $m^2/g$ and the cerium concentration is 40 mol % (equivalent to 48.2 wt % of the catalyst).

Next, a dispersion liquid in which this carrier is dispersed was heated to 70° C., 30 mL of an aqueous solution of 2.5 wt % hydrazine were added dropwise for a duration of one hour, and the dispersion liquid was held at 70° C. and stirred for two hours, whereby Pt was reduced. After that, the dispersion liquid was filtered, a powder thus obtained was dried at 110° C. overnight and calcined in the air at 450° C. for two hours, whereby a Pt/CZO catalyst was obtained. When the catalyst after drying at 110° C. was observed under a TEM, the presence of Pt particles of about 3 nm was verified.

Example 2

Pt/Pd/CZO Catalyst

A mixture of 17.84 g of a nitric acid solution of dinitrodiamine platinum (Pt concentration: 4.54 wt %) and 4.32 g of a nitric acid solution of palladium dinitrate (Pd concentration: 4.40 wt %) was prepared, and this mixture was diluted with distilled water to 100 mL in a measuring flask, whereby a metal salt solution was obtained. And the same PEI solution as in Example 1 was added to 10 mL of this precious metal salt solution and other operations were performed by the same process as in Example 1, whereby a Pt/Pd/CZO catalyst was obtained. When the catalyst after drying was also observed under a TEM, the presence of particles of about 3 nm was verified. When an analysis by EDX was performed, the presence of Pt and Pd was verified within single particles.

Example 3

Pt/Rh/CZO Catalyst

A mixture of 18.06 g of a nitric acid solution of dinitrodiamine platinum (Pt concentration: 4.54 wt %) and 1.81 g of a solution of rhodium nitrate (Rh concentration: 10.0 wt %) was prepared, and this mixture was diluted with distilled water to 100 mL in a measuring flask, whereby a metal salt solution was obtained. And the same PEI solution as in Example 1 was added to 10 mL of this precious metal salt solution and other operations were performed by the same process as in Example 1, whereby a Pt/Rh/CZO catalyst was obtained. When the catalyst after drying was also observed under a TEM, the presence of particles of about 3 nm was verified. When an analysis by EDX was performed, the presence of Pt and Rh was verified within single particles.

Example 4

Pt/CZO Catalyst (Particle Size: 5 nm)

A Pt/CZO catalyst was prepared by performing the same operations as in Example 1, with the exception that in place of the polyethylene imine having a molecular weight of 50000 in Example 1, 2.21 g of polyethylene imine having a molecular weight of 200000 were diluted to 100 mL in a measuring flask. In this example, a catalyst having a larger particle size of catalyst particles (platinum) than in Example 1 is manufactured.

Example 5

Pt/CZO Catalyst (Particle Size: 1 nm)

A Pt/CZO catalyst was prepared by performing the same operations as in Example 1, with the exception that in place of the polyethylene imine having a molecular weight of 50000 in Example 1, 2.21 g of polyethylene imine having an average molecular weight of 5000 were diluted to 100 mL in a measuring flask. In this example, a catalyst having a smaller particle size of catalyst particles (platinum) than in Example 1 is manufactured.

Comparative Example 1

(Pt/CZO (Atomic Supporting Condition)

After dropwise addition of 2.20 g of a nitric acid solution of dinitrodiamine platinum (Pt concentration: 4.54 wt %) to a dispersion liquid obtained by dispersing 10 g of CZO in 30 ml of water, stirring was performed for 30 minutes, whereby dinitrodiamine platinum was caused to be adsorbed on a carrier. After that, the dispersion liquid was filtered and a powder thus obtained was dried overnight at 110° C. and calcined in the air at 450° C. for two hours, whereby a Pt/CZO catalyst was obtained.

Comparative Example 2

Pt/Pd/CZO (Atomic Supporting Condition)

A Pt/Pd/CZO catalyst was obtained by performing the same operations as in Comparative Example 1, with the exception that the metal salt solution added dropwise to the CZO dispersed liquid in Comparative Example 1 was replaced with 1.78 g of a nitric acid solution of dinitrodiamine platinum (Pt concentration: 4.54 wt %) and 0.43 g of a solution of palladium nitrate (Pd concentration: 4.4 wt %).

Comparative Example 3

Pt/Rh/CZO (Atomic Supporting Condition)

A Pt/Rh/CZO catalyst was obtained by performing the same operations as in Comparative Example 1, with the exception that the metal salt solution added dropwise to the CZO dispersed liquid in Comparative Example 1 was replaced with 1.81 g of a nitric acid solution of dinitrodiamine platinum (Pt concentration: 4.54 wt %) and 0.181 g of an aqueous solution of rhodium nitrate (Rh concentration: 10 wt %).

Comparative Example 4

$Pt/Al_2O_3$ (Atomic Supporting Condition)

A $Pt/Al_2O_3$ catalyst was obtained by performing the same operations as in Comparative Example 1, with the exception that the carrier used in Comparative Example 1 was replaced with 10 g of alumina.

Comparative Example 5

$Pt/Rh/Al_2O_3$ (Atomic Supporting Condition)

A $Pt/Rh/Al_2O_3$ catalyst was obtained by performing the same operations as in Comparative Example 2, with the exception that the carrier used in Comparative Example 2 was replaced with 10 g of alumina.

Comparative Example 6

$Pt/SiO_2$ (Atomic Supporting Condition)

A $Pt/SiO_2$ catalyst was obtained by performing the same operations as in Comparative Example 1, with the exception that the carrier used in Comparative Example 1 was replaced with 10 g of silica.

Comparative Example 7

$Pt/Rh/SiO_2$ (Atomic Supporting Condition)

A $Pt/Rh/SiO_2$ catalyst was obtained by performing the same operations as in Comparative Example 3, with the exception that the carrier used in Comparative Example 3 was replaced with 10 g of silica.

Comparative Example 8

$Pt/SiO_2—Al_2O_3$ (Atomic Supporting Condition)

A $Pt/SiO_2—Al_2O_3$ catalyst was obtained by performing the same operations as in Comparative Example 1, with the exception that the carrier used in Comparative Example 1 was replaced with 10 g of silica-alumina.

Comparative Example 9

$Pt/Rh/SiO_2—Al_2O_3$ (Atomic Supporting Condition)

A $Pt/Rh/SiO_2—Al_2O_3$ catalyst was obtained by performing the same operations as in Comparative Example 3, with the exception that the carrier used in Comparative Example 3 was replaced with 10 g of silica-alumina.

Comparative Example 10

Pt/ZrO$_2$ (Atomic Supporting Condition)

A Pt/ZrO$_2$ catalyst was obtained by performing the same operations as in Comparative Example 1, with the exception that the carrier used in Comparative Example 1 was replaced with 10 g of zirconia.

Comparative Example 11

Pt/Rh/ZrO$_2$ (Atomic Supporting Condition)

A Pt/Rh/ZrO$_2$ catalyst was obtained by performing the same operations as in Comparative Example 3, with the exception that the carrier used in Comparative Example 3 was replaced with 10 g of zirconia.

Comparative Example 12

Pt/TiO$_2$ (Atomic Supporting Condition)

A Pt/TiO$_2$ catalyst was obtained by performing the same operations as in Comparative Example 1, with the exception that the carrier used in Comparative Example 1 was replaced with 10 g of titania.

Comparative Example 13

Pt/Rh/TiO$_2$ (Atomic Supporting Condition)

A Pt/Rh/TiO$_2$ catalyst was obtained by performing the same operations as in Comparative Example 3, with the exception that the carrier used in Comparative Example 3 was replaced with 10 g of titania.

Figure 4:
FIG. 4 is a TEM image obtained by an observation of the surface condition of a catalyst when calcining treatment is performed after drying.

Out of the catalysts produced above, the catalyst of Example 1 was observed under a TEM. In this observation, the morphology of the catalyst surface was observed in two stages, i.e., after reducing treatment and drying and after the calcining treatment performed thereafter. The results of the observation are shown in FIGS. 3 and 4. FIG. 3 is a TEM image of the carrier surface immediately after drying, and it is apparent that granular platinum particles (black) are scattered on the carrier surface. The particle size of the platinum particles was 3 nm. On the other hand, FIG. 4 is a TEM image of the catalyst surface after calcination at 450° C. for 2 hours. In FIG. 4, granular platinum particles cannot be observed on the catalyst surface after calcinations. However, when this catalyst was qualitatively analyzed through EDX at points 1 to 8 in FIG. 4, results shown in Table 1 were obtained.

TABLE 1

| Point | Pt | Ce | Zr |
|---|---|---|---|
| 1 | 0.16 | 45.77 | 54.07 |
| 2 | 1.20 | 46.98 | 51.82 |
| 3 | 1.16 | 44.16 | 54.70 |
| 4 | 15.15 | 46.09 | 38.76 |
| 5 | 0.75 | 41.71 | 57.54 |
| 6 | 5.56 | 39.88 | 51.55 |
| 7 | 0.09 | 40.80 | 59.12 |
| 8 | 2.05 | 48.88 | 49.07 |

Beam diameter: 0.5 to 1 nm

As is apparent from this table, the presence of platinum is detected everywhere even if outwardly the presence of platinum cannot be recognized from FIG. 4. From these results, it can be ascertained that in a catalyst of the present invention, catalyst particles take a granular morphology as shown in FIG. 1(a) immediately after the catalyst particles are supported on the carrier (immediately after reducing treatment) and the granular platinum particles change to a planar morphology as shown in FIG. 1(b) when calcination is later performed. This trend is observed also in other examples. In Example 4, although platinum particles with a particle size of 5 nm was observed after drying, this was not reflected in a TEM image obtained after calcination.

Next, the CO adsorption amount was measured in each catalyst. In this measurement of the CO adsorption amount, because CO of one molecule is adsorbed on one atom of platinum, on the surface of which CO is exposed, it is possible to calculate, from the count number, the proportion of the platinum particles exposed to the surface in the platinum particles which are supported. This proportion is called the degree of dispersion. "Degree of dispersion 1" shows that all platinum is present on the surface, and the lower this numerical value, the more platinum particles will aggregate and be present in cluster shape. In this test, after the catalyst was hydrogen reduced at 200° C. as a pretreatment, measurements were made by the CO pulse method by use of a TCD detector. The results are shown in Table 2.

TABLE 2

| | Production conditions | | |
|---|---|---|---|
| | Carrier | Metal particles | Degree of dispersion |
| Example 1 | CZO | Pt Complex | 0.41 |
| Example 2 | | Pt/Pd Complex | 0.45 |
| Example 3 | | Pt/Rh Complex | 0.42 |
| Example 4 | | Pt Complex | 0.27 |
| Example 5 | | Pt Complex | 0.63 |
| Comparative Example 1 | CZO | Pt Atomic | 1.18 |
| Comparative Example 2 | | Pt/Pd Atomic | 1.09 |
| Comparative Example 3 | | Pt/Rh Atomic | 1.12 |
| Comparative Example 4 | Al$_2$O$_3$ | Pt Atomic | 0.82 |
| Comparative Example 5 | | Pt/Rh Atomic | 0.83 |

In Table 2, the degree of dispersion is close to 1 in the catalysts of Comparative Examples 1 to 5 and it was ascertained from this fact that almost all the precious metals which are supported disperse in an atomic state. In contrast to this, the degree of dispersion is 0.27 to 0.63 in the catalysts of Examples 1 to 5 and it was ascertained that the precious metals are supported in an aggregated manner. In catalysts having different particle sizes as in Examples 1, 4 and 5, the degree of dispersion decreases with increasing particle size. In the catalysts of the examples, the particle size of the catalyst particles estimated from the values of degree of dispersion is 2 to 3 nm or so in Examples 1 to 3, 4 to 5 nm or so in Example 4, and 1 to 1.5 nm in Example 5.

Next, each of the produced catalysts was subjected to heat treatment under the following conditions, an X-ray diffraction analysis was performed for catalysts obtained immediately after the production (those subjected to calcining treatment at 450° C. for 2 hours) and those obtained after the heat treatment, and crystallite diameters were calculated by the Scholler method. The results are shown in Table 3.

Heat Treatment Conditions
   800° C.×5 hours
   1000° C.×5 hours
   Heating in the air at the temperatures and time given above occur because of a strong interaction between CZO and platinum even the platinum particles are subjected to heat treatment and hence the atomic supporting condition is maintained.

After the above-described preliminary study, a reaction activity test of each catalyst was conducted by changing the conditions in various manners, and the characteristics of the catalysts were evaluated.

Reaction Activity Test 1

A propylene decomposition reaction test was performed on each catalyst and 50% conversion temperatures were found.

TABLE 3

| | Production conditions | | Crystalline diameter (nm) | | |
|---|---|---|---|---|---|
| | Carrier | Metal particles | Immediately after production | 800° C. × 5 hr | 1000° C. × 5 hr |
| Example 1 | CZO | Pt Complex | — | — | — |
| Example 2 | | Pt/Pd Complex | — | — | — |
| Example 3 | | Pt/Rh Complex | — | — | — |
| Example 4 | | Pt Complex | — | — | — |
| Example 5 | | Pt Complex | — | — | — |
| Comparative Example 1 | CZO | Pt Atomic | — | — | — |
| Comparative Example 2 | | Pt/Pd Atomic | — | — | — |
| Comparative Example 3 | | Pt/Rh Atomic | — | — | — |
| Comparative Example 4 | $Al_2O_3$ | Pt Atomic | — | 21 | 28 |
| Comparative Example 5 | | Pt/Rh Atomic | — | 17 | 26 |
| Comparative Example 6 | $SiO_2$ | Pt Atomic | — | 29 | 33 |
| Comparative Example 7 | | Pt/Rh Atomic | — | 25 | 30 |
| Comparative Example 8 | $SiO_2$—$Al_2O_3$ | Pt Atomic | — | 22 | 27 |
| Comparative Example 9 | | Pt/Rh Atomic | — | 18 | 25 |
| Comparative Example 10 | $ZrO_2$ | Pt Atomic | — | 29 | 35 |
| Comparative Example 11 | | Pt/Rh Atomic | — | 27 | 33 |
| Comparative Example 12 | $TiO_2$ | Pt Atomic | — | 18 | 27 |
| Comparative Example 13 | | Pt/Rh Atomic | — | 16 | 25 |

—: Peaks coming from Pt are not observed or crystalline diameter cannot be calculated due to too small diameters.

It was suggested from Table 3 that in Comparative Examples 4 to 13, due to heat treatment at 800° C. or higher, the crystalline diameter of catalyst particles increases greatly with increasing calcining temperature and that the catalyst particles coarsen. On the other hand, in Pt/CZO of Example 1, peaks coming from Pt and PtO were scarcely observed. In Comparative Examples 1 to 3, the growth of catalyst particles due to heat treatment was not observed; it is thought that this is because the migration of platinum particles does not easily The reaction test was conducted by use of a fixed bed flow reactor under the following conditions. The results are shown in Table 4.

Reaction Test Conditions
   Propylene concentration: 640 ppm
   Oxygen concentration: 2.56% (nitrogen balance)
   Amount of catalyst (W/F): 0.5 g-cat·min/L
   Test temperature: Immediately after production, 800° C.×5 hours, 1000° C.×5 hours

TABLE 4

| | Production conditions | | 50% conversion temperature | | |
|---|---|---|---|---|---|
| | Carrier | Metal particles | Immediately after production | 800° C. × 5 hr | 1000° C. × 5 hr |
| Example 1 | CZO | Pt Complex | 148 | 212 | 218 |
| Example 2 | | Pt/Pd Complex | 134 | 173 | 169 |
| Example 3 | | Pt/Rh Complex | 141 | 182 | 184 |
| Comparative Example 1 | CZO | Pt Atomic | 254 | 328 | 302 |
| Comparative Example 2 | | Pt/Pd Atomic | 256 | 302 | 289 |
| Comparative Example 3 | | Pt/Rh Atomic | 248 | 318 | 298 |
| Comparative Example 4 | Al$_2$O$_3$ | Pt Atomic | 192 | 254 | 263 |
| Comparative Example 5 | | Pt/Rh Atomic | 178 | 238 | 248 |

From table 4, it is apparent that the catalysts of Examples 1 to 3 in which catalyst particles are supported in cluster shape on CZO have low conversion temperatures immediately after the production and are excellent in catalytic activity. In the case of high-temperature heating, in the catalysts of Comparative Examples 4 and 5, the activity decreases with increasing heat treatment temperature. This is because the coarsening of catalyst particles occurred due to the heat treatment. Although a decrease in activity is observed in the catalysts of Examples 1 to 3, the decrease in activity due to a rise in temperature is small and these catalysts maintain their activity. The catalysts of Comparative Examples 1 to 3 in which a CZO atomic carrier is used have lower activity than catalysts using an alumina carrier. It is thought that this is because in the case of the alumina carrier, catalyst particles in an atomic state aggregate into catalyst particles due to the calcination during catalyst production, whereas in the case of the CZO carrier, the migration of catalyst particles in an atomic state does not occur and the carrier remains to be in an atomic state, resulting in a decrease in activity. It can also be ascertained that even with catalysts of the same morphology, binary composite clusters of platinum/palladium and platinum/rhodium have better activity. In the case of the atomic supporting condition, the catalyst activity of platinum/palladium (Comparative Example 2) and platinum/rhodium (Comparative Example 3) is almost the same as that of platinum alone (Comparative Example 1). This is because the migration of particles does not occur even by heat treatment and hence alloy species having high activity are not formed. In this test, the catalysts of Examples 1 to 3 after the heating test at 800° C. are supposed to correspond to the morphology of FIG. 1(c).

Figure 5:
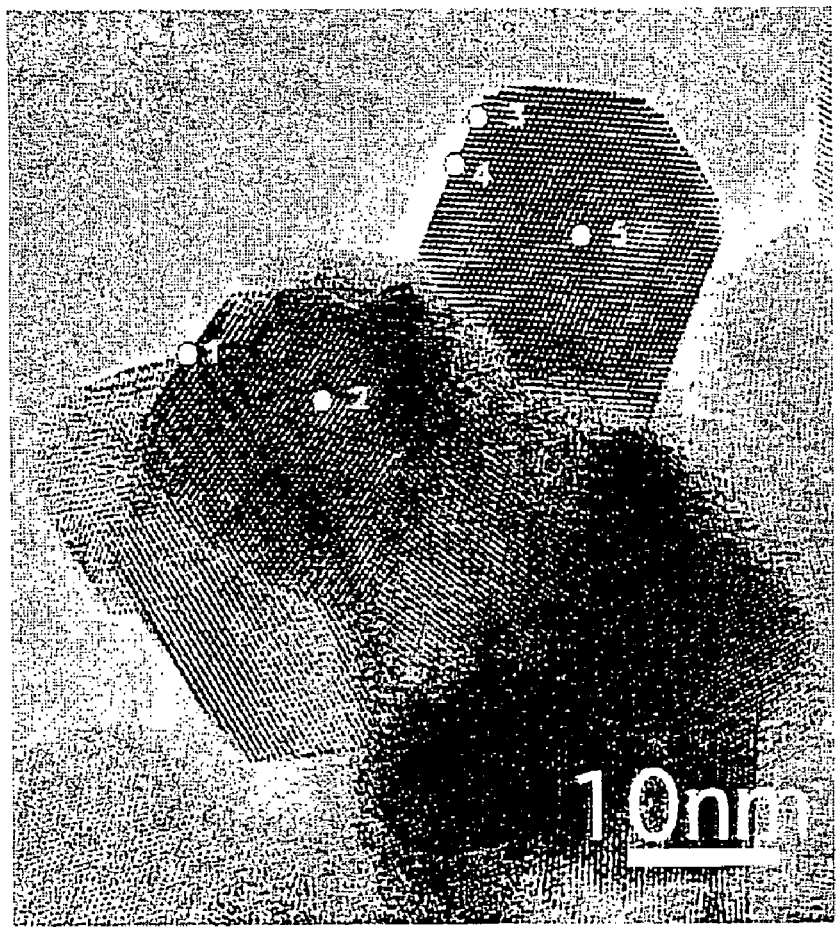
FIG. 5 is a TEM image of the catalyst surface observed after a catalyst of Example 1 is heat treated at 800° C. for 5 hours.

FIG. 5 is a TEM image of the catalyst surface observed after the catalyst of Example 1 is heat treated at 800° C. for 5 hours. As is apparent from FIG. 5, when the catalyst of Example 1 is heat treated at 800° C., the presence of catalyst particles (platinum) on the carrier surface was not verified with the TEM image. Therefore, a qualitative analysis by EDX was performed as in the case of FIG. 4, and the following results were obtained.

TABLE 5

| Point | Pt | Ce | Zr |
|---|---|---|---|
| 1 | 2.21 | 36.85 | 60.94 |
| 2 | — | 40.35 | 59.46 |
| 3 | 4.72 | 39.72 | 55.56 |
| 4 | 3.26 | 50.07 | 46.67 |
| 5 | 0.49 | 43.35 | 56.16 |

Beam diameter: 0.5 to 1 nm

Figure 6:
FIG. 6 is a TEM image of the catalyst surface observed after a catalyst of Comparative Example 1 is heat treated at 800° C. for 5 hours.

As is apparent from the results, the presence of platinum was verified even in the catalyst after heat treatment at 800° C., and it becomes evident that catalyst particles which are so thin that they exceed the limit of a TEM observation are supported. On the other hand, FIG. 6 is a TEM image of the catalyst surface observed after the catalyst of Comparative Example 1 is heat treated at 800° C. for 5 hours. It is apparent that in the case of this catalyst in which this atomic platinum is supported on alumina, catalyst particles aggregate due to the heating at 800° C. and coarsen.

Reaction Activity Test 2

Next, an investigation was made as to whether catalytic activity is maintained when the heat treatment time is long. The heat treatment conditions were set as follows on the concept that the time immediately after production (after the calcination at 450° C. for 2 hours) is regarded as an elapsed time of zero hours. The conditions for the reaction test are the same as described above. The results are shown in Table 6.

Heat Treatment Conditions

800° C.×5 hours

800° C.×50 hours

800° C.×200 hours

Heating in the air at the temperatures and time given above

TABLE 6

| | Production conditions | | 50% conversion temperature | | | |
|---|---|---|---|---|---|---|
| | Carrier | Metal particles | Immediately after production | 800° C. × 5 hr | 800° C. × 50 hr | 800° C. × 200 hr |
| Example 1 | CZO | Pt Complex | 148 | 212 | 213 | 210 |
| Example 2 | | Pt/Pd Complex | 134 | 173 | 171 | 169 |
| Example 3 | | Pt/Rh Complex | 141 | 182 | 187 | 187 |
| Comparative Example 1 | CZO | Pt Atomic | 254 | 328 | 328 | 332 |
| Comparative Example 2 | | Pt/Pd Atomic | 256 | 302 | 299 | 295 |
| Comparative Example 3 | | Pt/Rh Atomic | 248 | 318 | 321 | 328 |
| Comparative Example 4 | Al$_2$O$_3$ | Pt Atomic | 192 | 254 | 270 | 278 |
| Comparative Example 5 | | Pt/Rh Atomic | 178 | 238 | 242 | 245 |

From Table 6, it becomes clear that in the catalysts of Comparative Examples 4 and 5, the activity tends to decrease with increasing treatment time and that the catalysts of Comparative Examples 1 to 3 also have low activity. As with the case of the reaction activity test 1, the phenomenon depends on whether the migration of catalyst particles occurs and whether the coarsening of catalyst particles occurs. In contrast to this, the catalysts of Examples 1 to 3 maintain high activity even after heating for a long time of 200 hours.

Reaction Activity Test 3

A reaction activity test was conducted to investigate changes in catalysts in a lean gas/rich gas repeating environment. In this test, a decomposition test for the catalyst immediately after production and the catalyst subjected to the following heat treatment was conducted on the following lean gas/rich gas as gases to be treated by use of a fixed bed flow reactor. The results are shown in Table 7.

Heat Treatment Atmosphere
  Rich gas composition: CO$_2$ (10%)+CO (1.6%)+C$_3$H$_6$ (900 ppm)+O$_2$ (0.505%)
  Lean gas composition: CO$_2$ (10%)+CO (0.4%)+C$_3$H$_6$ (900 ppm)+O$_2$ (1.305%)
  Lean/rich gas cycle=1 min/1 min Heat Treatment Time
  800° C.×5 hours
  1000° C.×5 hours
  Amount of catalyst (W/F): 10 g-cat·min/L Reaction Test Conditions
  Propylene concentration: 640 ppm
  Oxygen concentration: 2.56% (nitrogen balance)
  Amount of catalyst (W/F): 0.5 g-cat·min/L

TABLE 7

| | Production conditions | | C$_3$H$_6$ 50% conversion temperature (° C.) | | | | |
|---|---|---|---|---|---|---|---|
| | | | | 800° C. × 5 hr | | 1000° C. × 5 hr | |
| | Carrier | Metal particles | Immediately after production | In the air | Rich/ lean gas | In the air | Rich/ lean gas |
| Example 1 | CZO | Pt Complex | 148 | 212 | 152 | 218 | 163 |
| Example 2 | | Pt/Pd Complex | 134 | 173 | 128 | 169 | 135 |
| Example 3 | | Pt/Rh Complex | 141 | 182 | 143 | 184 | 148 |
| Comparative Example 1 | CZO | Pt Atomic | 254 | 328 | 204 | 302 | 231 |
| Comparative Example 2 | | Pt/Pd Atomic | 256 | 302 | 181 | 289 | 201 |
| Comparative Example 3 | | Pt/Rh Atomic | 248 | 318 | 193 | 298 | 211 |

Table 7 shows the results of the test. As shown in Table 7, although all of the catalysts subjected to heat treatment during the lean/rich gas flow exhibited higher reaction activity than those heat treated in the air, the difference in the activity due to the heat treatment atmosphere is especially remarkable in the catalysts in which a CZO carrier is used. And the catalysts of the examples are especially excellent also in catalytic activity. It is thought that the high catalytic activity observed in the examples of the present invention is due to the action that the catalytic activity which has decreased in a lean atmosphere restores to an original state in a rich atmosphere and the action of a further increase in activity which occurs in a rich atmosphere.

Although a similar effect is observed also in the catalyst of Comparative Example 1, it can be said that due to the existence of Pt in an atomic state, the decrease in activity in a lean atmosphere is too large so that the same effect as in Example 1 was not be obtained. In other words, for platinum which is supported in an atomic state on a porous oxide carrier containing cerium, even the atmosphere is changed, it is very difficult, by performing heating, to bring the particles into an ideal condition in which 10 to 50000 atoms of the precious metal gather. It is apparent that it is important that precious metal particles in a condition in which 10 to 50000 atoms of the precious metal gather be synthesized from the beginning and that after that, the precious metal particles be supported on a porous oxide containing cerium.

From the test results, it was ascertained that the catalysts of the examples of the present invention function effectively as catalysts for gasoline engine, namely, what is called ternary catalysts. That is, a gasoline engine has a mechanism which is such that a slightly lean atmosphere (air-fuel ratio: 15) and a rich atmosphere (air-fuel ratio: 13) with respect to the theoretical air-fuel ratio are cyclically treated at intervals of milliseconds. Therefore, it follows that a decrease in catalytic activity and a recovery of catalytic activity are repeated by applying the catalysts of the examples to a gasoline engine (the morphology of FIG. 1(b) and that of FIG. 1(d) appear repeatedly).

Reaction Activity Test 4

In this test, heat treatment was performed by alternately repeating an oxidizing atmosphere and a reducing atmosphere. Catalytic activity occurring upon switching the atmospheres was evaluated and changes in catalytic activity were examined. The steps of this test are as follows.
(1) A reaction test after heat treatment in the air at 800° C. for 5 hours
(2) Heat treatment at 800° C. for 30 minutes in 1%-$H_2$/$N_2$ (first reduction)
(3) A reaction test after calcination in the air at 450° C. for 2 hours
(4) Heat treatment at 800° C. for 30 minutes in 1%-$H_2$/$N_2$ (second reduction)
(5) A reaction test after calcination in the air at 450° C. for 2 hours
(6) A reaction test after heat treatment in the air at 800° C. for 5 hours
(7) Heat treatment at 800° C. for 30 minutes in 1%-$H_2$/$N_2$ (third reduction)
(8) A reaction test after calcination in the air at 450° C. for 2 hours
(9) A reaction test after heat treatment in the air at 800° C. for 5 hours Reaction Test Conditions
Propylene concentration: 640 ppm
Oxygen concentration: 2.56% (nitrogen balance)
Amount of catalyst (W/F): 0.5 g-cat·min/L

TABLE 8

| | Production conditions | | Before reducing treatment | First reduction (2) | Second reduction (4) | | Third reduction (5) | |
|---|---|---|---|---|---|---|---|---|
| | | | Immediately | After | After | | After | |
| | Carrier | Metal particles | after production | 800° C. (1) | calcination (3) | calcination (5) | 800° C. (6) | calcination (8) | 800° C. (9) |
| Example 1 | CZO | Pt Complex | 148 | 212 | 153 | 154 | 213 | 151 | 210 |
| Example 2 | | Pt/Pd Complex | 134 | 173 | 141 | 139 | 170 | 138 | 168 |
| Example 3 | | Pt/Rh Complex | 141 | 182 | 145 | 147 | 181 | 147 | 183 |
| Comparative Example 1 | CZO | Pt Atomic | 254 | 328 | 178 | 178 | 328 | 186 | 330 |
| Comparative Example 2 | | Pt/Rh Atomic | 262 | 302 | 179 | 176 | 300 | 175 | 297 |
| Comparative Example 3 | | Pt/Pd Atomic | 248 | 318 | 182 | 181 | 324 | 188 | 328 |

Table 8 shows the results of this test. It can be ascertained from this table that the catalysts of the examples recover their catalytic activity by performing hydrogen reducing treatment. This behavior is described in detail. First, the catalysts come to a reduced and regenerated condition by the first reducing treatment (the above step (2)), and exhibit higher activity than the activity before the reduction (the above step (1)). It is thought that this is because the platinum and CZO on the catalysts undergo a change of state to the same state as a fresh catalyst. That is, it is thought that the morphological change of FIG. 1(d) occurred.

The catalysts of the comparative examples also exhibit the same behavior as the examples and their activity increases due to the reducing treatment at 800° C. However, the activity observed after the catalysts are again subjected to heat treatment at 800° C. for 5 hours in the air decreases to the original levels which are lower than the levels of the examples. If the improvement in the catalytic activity by the reducing treatment is due to a slight growth of Pt particles and the formation of platinum clusters as in the examples, then the catalytic activity observed after the catalysts are again subjected to heat treatment at 800° C. for 5 hours in the air should exhibit the same catalytic activity as in the examples. Estimations regarding the behavior in Comparative Example 1 include (1)

Pt which is supported in an atomic state does not migrate on the carrier even by high-temperature oxidizing heat treatment and maintains the atomic state, and (2) the high catalytic activity which appears after reduction is due to the effects other than particle growth.

Examples 2 and 3 in which Pt/Pd and Pt/Rh are supported in alloyed form exhibit activity higher than the activity observed when Pt alone is supported owing to alloying. In contrast to this, the catalysts of Comparative Examples 2 and 3, which are conventional catalysts, exhibit almost the same results as Comparative Example 1, because the precious metals exist in an atomic state even after heat treatment without forming alloy species.

Reaction Activity Test 5

In this test, for the catalysts of Example 1, a difference in the condition of catalyst particles was verified between a catalyst calcined at 450° C. and a catalyst heated at 800° C. In this test, first, the degree of dispersion by CO adsorption amount measurement and reaction activity (conversion temperature) were measured for the catalyst of Example 1 immediately after production and the catalyst of Example 1 heated at 800° C. Next, the reaction activity observed when these catalysts were subjected to reducing treatment and calcining treatment was measured. The measurement of the CO adsorption amount was made in the same manner as described above. Three levels of temperatures of 200° C., 450° C. and 800° C. were set as reducing treatment temperatures, and the calcining temperature after the reducing treatment was set at 450° C. The results of the test are shown in Table 9.

TABLE 9

|  | | $C_3H_6$ 50% conversion temperature (° C.) | | | |
| --- | --- | --- | --- | --- | --- |
|  | Degree of adsorption | Before reduction | Reduction at 200° C. | Reduction at 450° C. | Reduction at 800° C. |
| Immediately after production | 0.41 | 148 | 147 | 148 | 147 |
| 800° C. 5 h Heating | 0.65 | 212 | 209 | 198 | 153 |

Concerning the measurement of the degree of adsorption, seen from Table 9 is an increase in the degree of adsorption when the catalyst of Example 1 is heated at 800° C. In consideration of the essential significance of the degree of CO adsorption, this result shows that the degree of dispersion of the catalyst particles of the catalyst after heating increases. However, it is impossible from a common sense standpoint that catalyst particles of one catalyst which have been formed would split and disperse. Therefore, the reason why this result was obtained is thought as follows. That is, although in the measurement of the degree of adsorption it is necessary to perform hydrogen reduction at 200° C. before the measurement, in the catalyst immediately after production, the morphology of the catalyst particles changes from a flat shape to a spherical shape during the hydrogen reduction, whereas in the catalyst heated at 800° C., the oxidation of the catalyst particles proceeds under the formation of a complex oxide as shown in FIG. 1(d) and a change to a spherical shape does not occur by the reduction at 200° C., resulting in a high degree of dispersion. That is, it is thought that both the catalyst immediately after production and the catalyst heated at 800° C. were in the same dispersion condition before the measurement of the degree of adsorption and had the same morphology of the catalyst particles.

This can be estimated from the results of the activity test of Table 9. That is, in the catalyst immediately after production, a recovery of activity is observed by the reduction at 200 to 800° C. On the other hand, in the catalyst heated at 800° C. a recovery of activity occurs by the reduction at 800° C. although a recovery of activity is not observed at reduction temperatures of not more than 450° C. This result is in agreement with the above-described discussion and shows that even in the case of a catalyst which is heated to 800° C. and whose activity decreases, it is possible to regenerate this catalyst as a catalyst having the same activity as observed immediately after production by setting the reduction temperature at a high level.

Next, an investigation was made into a difference in catalytic characteristics which depend on the properties of a carrier. Two catalysts different from Example 1 were produced and the characteristics of these catalysts were evaluated.

Comparative Example 14

The carrier (surface area: 67 $m^2$/g) used in Example 1 was calcined in the air at 1200° C. for 5 hours and the surface area was reduced to 2.6 $m^2$/g. And a Pt/CZO catalyst was obtained by using this carrier in the same manner as in Example 1.

Comparative Example 15

By using CZO having a cerium concentration of 5 mol % (surface area: 58 $m^2$/g) in place of the carrier (cerium concentration: 40 mol %) used in Example 1, a Pt/CZO catalyst was obtained in the same manner as in Example 1.

And the above-described reaction activity test 3 and reaction activity test 4 were conducted on the catalysts of Comparative Examples 14 and 15. The results of the tests are shown in Tables 10 and 11.

TABLE 10

|  | Production conditions | | $C_3H_6$ 50% conversion temperature (° C.) | | |
| --- | --- | --- | --- | --- | --- |
|  | Surface area | Ce concentration | Immediately after production | 800° C. × 5 hr Lean/rich | 1000° C. × 5 hr Lean/rich |
| Example 1 | 67 $m^2$/g | 40 mol % | 148 | 152 | 163 |
| Comparative Example 14 | 2.6 $m^2$/g | 40 mol % | 141 | 243 | 256 |
| Comparative Example 15 | 58 $m^2$/g | 5 mol % | 142 | 198 | 212 |

TABLE 11

| | Production conditions | | Before reducing treatment | | First reduction (2) | Second reduction (4) | | Third reduction (5) | |
|---|---|---|---|---|---|---|---|---|---|
| | | | Immediately | | After | After | | After | |
| | Surface area | Ce concentration | after production | 800° C. (1) | calcination (3) | calcination (5) | 800° C. (6) | calcination (8) | 800° C. (9) |
| Example 1 | 67 m²/g | 40 mol % | 148 | 212 | 153 | 154 | 213 | 150 | 210 |
| Comparative Example 14 | 2.6 m²/g | 40 mol % | 141 | 253 | 213 | 225 | 259 | 228 | 262 |
| Comparative Example 15 | 58 m²/g | 5 mol % | 132 | 223 | 178 | 176 | 227 | 181 | 236 |

From these results, it is apparent that although the activity immediately after production is almost the same as in Example 1 in the case where the surface area of the carrier is small and in the case where the cerium concentration of the carrier is low, the recovery behavior by reduction after a decrease in activity by heating at 800° C. is not observed. It is thought that this is because in the catalysts of these comparative examples, the catalytic metal which is supported cannot take a morphology as shown in FIG. 1(b) and the coarsening of catalyst particles occurs due to the heating at 800° C.

The invention claimed is:

1. A catalyst for purifying an automotive exhaust gas comprising catalytic metal particles supported on a porous carrier, wherein the catalytic metal particles consist essentially of an alloy of two precious metals selected from platinum, palladium, and rhodium, wherein the porous carrier consists essentially of ceria-zirconia having a ceria content of from 15 wt % to 48.2 wt %, wherein the porous carrier has a specific surface area of 10 to 250 m²/g for 1 wt % of an amount of catalytic metal supported relative to the whole catalyst, wherein the catalytic metal particles have from 10 to 50000 atoms, and wherein the precious metals form single particles.

2. The catalyst according to claim 1, wherein the catalytic metal particles are supported as a single layer or multiple layers having a thickness of 1 to 5 atoms in an oxidizing atmosphere.

3. The catalyst according to claim 2, wherein at least one kind of the catalytic metal particles on the carrier forms a complex oxide comprising a precious metal of the particles and a ceria of the carrier.

4. A product formed by reducing the catalyst according to claim 2, the catalyst comprising granular catalytic metal particles having a particle size of 1 to 10 nm supported on a porous carrier.

5. A product formed by reducing the catalyst according to claim 3, the catalyst comprising granular catalytic metal particles having a particle size of 1 to 10 nm supported on a porous carrier.

* * * * *